(12) United States Patent
Lunde

(10) Patent No.: US 6,389,709 B1
(45) Date of Patent: May 21, 2002

(54) METHOD AND APPARATUS FOR CHECKING ELEVATION

(75) Inventor: Scott M. Lunde, 162 Alaska Rd., Boulder, CO (US) 80301

(73) Assignees: Enthios Corporation, Boulder, CO (US); Scott M. Lunde

( * ) Notice: Subject to any disclaimer, the term of this patent is extended or adjusted under 35 U.S.C. 154(b) by 0 days.

(21) Appl. No.: 09/521,225

(22) Filed: Mar. 8, 2000

Related U.S. Application Data

(60) Provisional application No. 60/123,210, filed on Mar. 8, 1999.

(51) Int. Cl.[7] .............................. G01B 3/10; G01C 5/00
(52) U.S. Cl. .............................. 33/768; 33/292; 33/373
(58) Field of Search .............................. 33/263, 275 R, 33/290, 292, 333, 334, 347, 354, 373, 759, 760, 761, 765, 768

(56) References Cited

U.S. PATENT DOCUMENTS

| | | | | |
|---|---|---|---|---|
| 2,941,297 A | * | 6/1960 | Howley et al. ............... | 33/292 |
| 3,021,599 A | * | 2/1962 | Odom ...................... | 33/275 R |
| 4,319,405 A | * | 3/1982 | Price .......................... | 33/292 |
| 4,574,486 A | * | 3/1986 | Drechsler ................... | 33/765 |
| 5,442,866 A | * | 8/1995 | Woods ........................ | 33/760 |
| 5,894,675 A | * | 4/1999 | Cericola ..................... | 33/760 |
| RE36,887 E | * | 10/2000 | Goldman ..................... | 33/759 |
| 6,209,219 B1 | * | 4/2001 | Wakefield et al. ............ | 33/768 |

* cited by examiner

*Primary Examiner*—G. Bradley Bennett
(74) *Attorney, Agent, or Firm*—Michael Best & Friedrich, LLP

(57) ABSTRACT

An apparatus for checking elevation between reference markers. The apparatus includes a measuring device (e.g., a tape measure) that can measure the distance from an elevated location to the ground immediately below the location. A sighting device and a leveling device (e.g., a hand level) are secured to the distance-measuring device so that a remote reference marker can be sighted. The distance-measuring device is calibrated such that it measures the distance from the ground to the centerline of the sighting device.

13 Claims, 2 Drawing Sheets

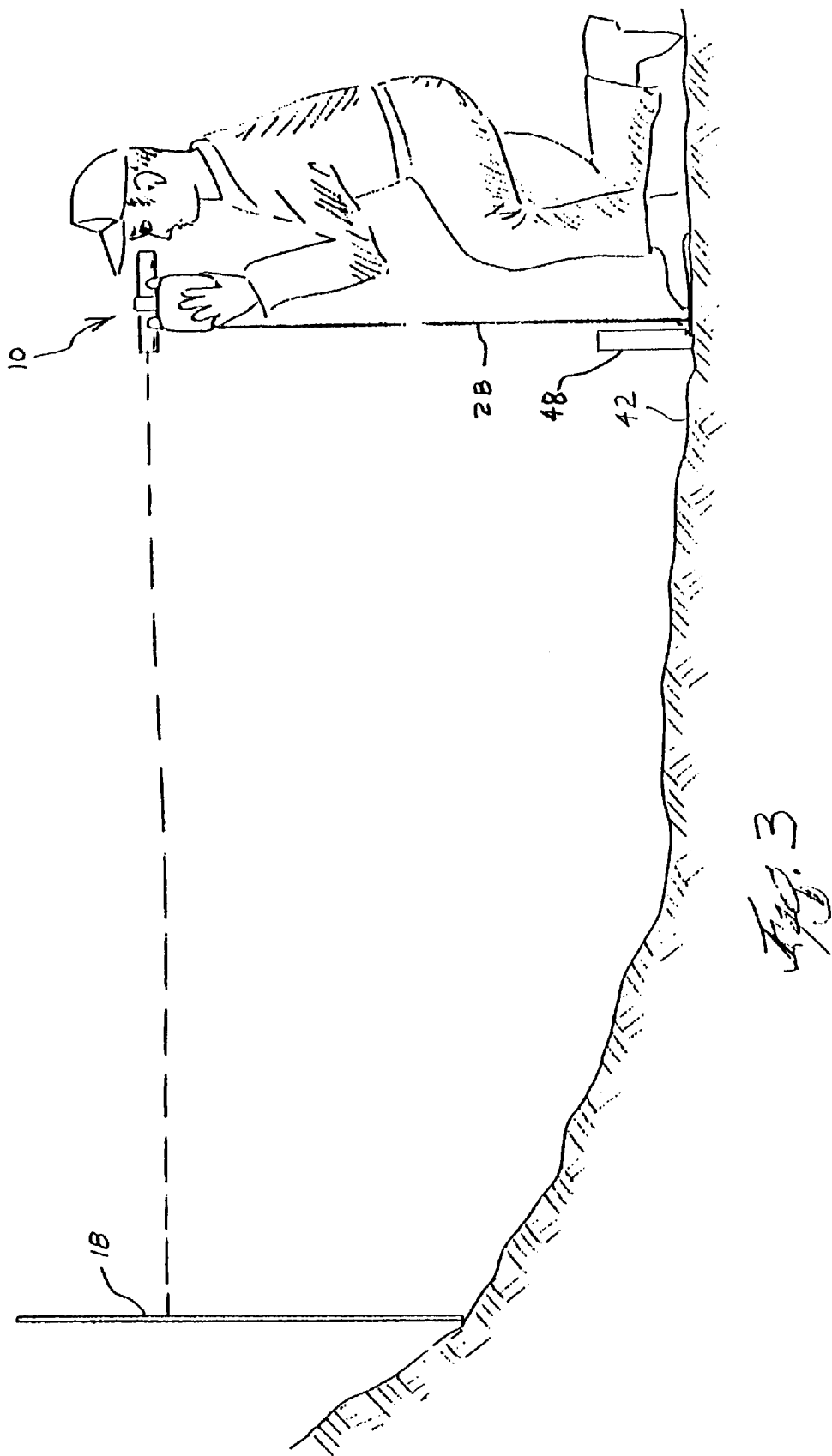

METHOD AND APPARATUS FOR CHECKING ELEVATION

This application claims the benefit of prior filed co-pending provisional patent application No. 60/123,210 filed on Mar. 8, 1999.

FIELD OF THE INVENTION

The present invention relates generally to instruments used during preparation of the ground surface of a site prior to building or landscaping. More specifically, the present invention relates to leveling instruments that can check elevation changes of a ground surface.

BACKGROUND OF THE INVENTION

When a site is being prepared for a project, it is important that the ground surface be properly graded according to the designer's specifications. For example, building sites must be properly graded to obtain the proper elevation of the building relative to the surrounding landscape, and landscaping sites (e.g., parks, golf courses, etc.) must be properly graded to ensure that certain aesthetic and drainage goals are achieved.

Grading projects are commonly started by surveying the site using a transit. During the surveying, markers are set into the ground to establish reference elevations. These reference markers are typically placed in a widely-spaced, grid-like pattern. The markers provide enough information to perform rough grading of the site.

An elevation map and hand level (sometimes referred to as an eyelevel) are then used to establish the proper elevation of the ground between the markers. The elevation map is used to determine the desired elevation of a chosen location. The actual elevation of that location is then determined in relation to one or more of the reference markers. More specifically, the worker will typically set a grading stake into the ground at the chosen location. A wooden rule is then unfolded, and one end of the wooden rule is rested on the ground with the wooden rule positioned vertically. Using the wooden rule as a vertical guide, the worker then uses a hand level to sight a nearby reference marker. The worker then approximates the position of the hand level on the wooden rule and uses this information to determine whether the chosen location is at the desired elevation. Any required change in elevation is marked on the grading stake. This process continues until enough locations have been staked to enable final grading of the entire site.

Because of the length of time and skill involved in using a transit to establish elevations, the number of reference markers established by the transit is typically maintained to a minimum by widely spacing them. The above-described grading stakes are then used to fill in the gaps. Although not as accurate as a transit, the use of a hand level and wooden rule to establish elevation is much quicker than a transit. This is important due to the large number of measurements that must be made on a typical site.

SUMMARY OF THE INVENTION

The present invention provides an improved apparatus for checking elevation between reference markers. The apparatus significantly reduces the amount of time required to establish the elevation of a location, and therefore can save considerable time in mapping desired elevation changes of a site.

The apparatus includes a measuring device (e.g., a tape measure) that can measure the distance from an elevated location to the ground immediately below the location. A sighting device and a leveling device (e.g., a hand level) are secured to the distance-measuring device so that a remote reference marker can be sighted. The distance-measuring device is calibrated such that it measures the distance from the ground to the centerline of the sighting device.

BRIEF DESCRIPTION OF THE DRAWINGS

FIG. 3 is a side view of a worker using the device of FIG. 1 to measure the elevation of a chosen location relative to a reference marker.

DETAILED DESCRIPTION

Figure 2:
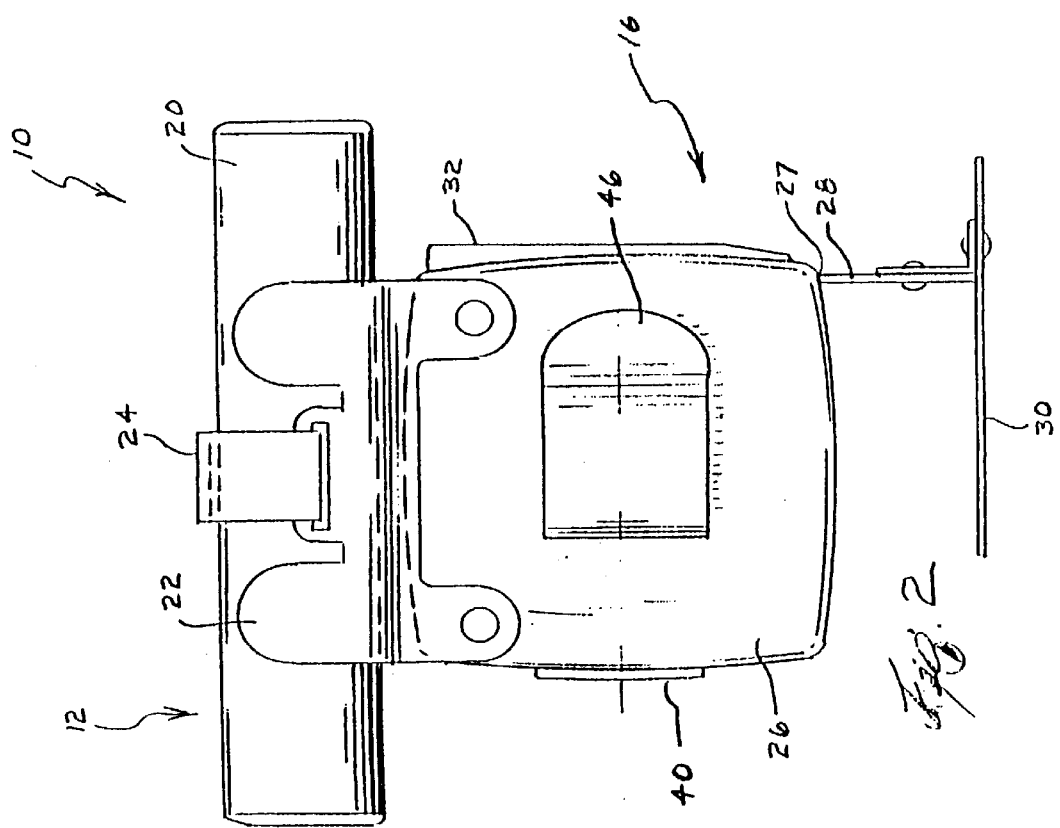
FIG. 2 is an assembled side view of the device of FIG. 1.

The illustrated elevation checking apparatus 10 includes three main components: a sighting device 12, a leveling device 14, and a measuring device 16. The sighting device 12 is used to align the apparatus 10 with a reference marker 18 at a distance. The leveling device 14 insures that the apparatus 10 is level when being used. When the reference marker 18 is sighted and the apparatus 10 is level, the sighting device 12 is at the same elevation as the reference marker 18. The measuring device 16 is used to provide an instantaneous measurement of the apparatus 10 away from a known surface.

Figure 1:
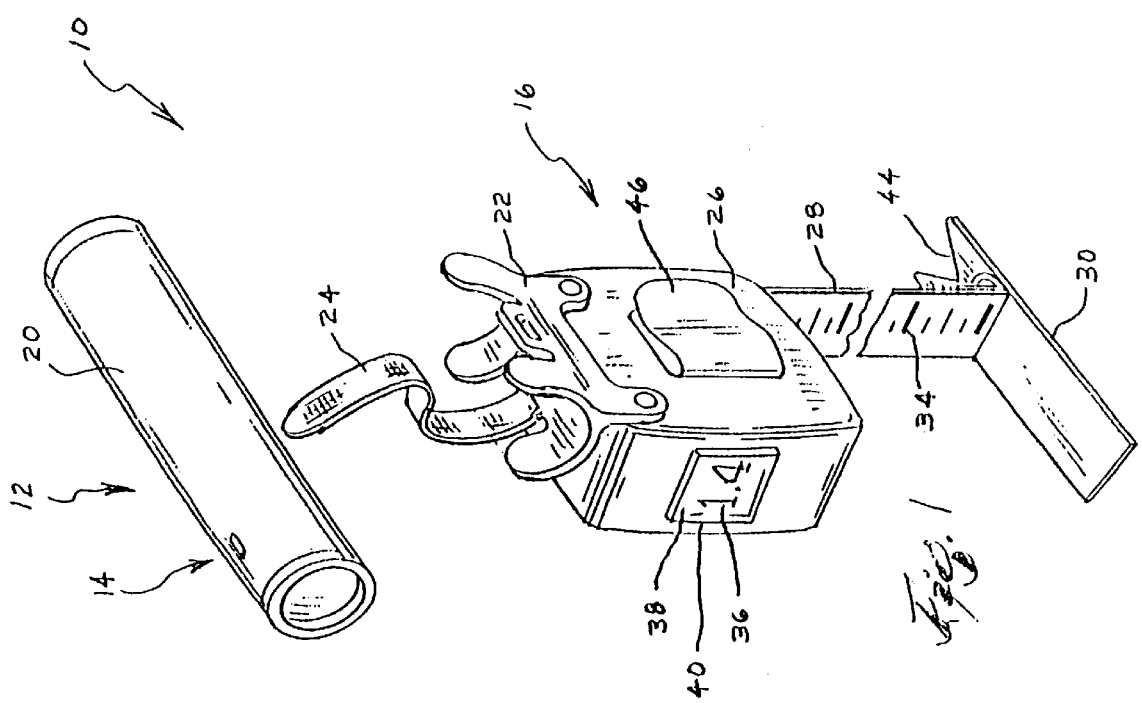
FIG. 1 is an exploded perspective view of a device embodying the present invention.

Referring to FIGS. 1 and 2, the illustrated sighting device 12 comprises a standard hand level 20, which are well known in the surveying field. The hand level 20 is design to be mounted in a support 22. The support 22 is made of a plastic material that will flex when the hand level 20 is pressed into the support 22. The support 22 is sized such that it will securely hold the hand level 20. A strap 24 is provided to insure that the hand level 20 stays securely fastened to the support 22. It should be appreciated that the sighting device 12 of the present invention can be any appropriate device that performs the required function of aligning the apparatus 10 with a reference marker 18. For example, instead of a visual device such as the illustrated hand level 20, the sighting device 12 could utilize light beams (e.g., lasers) or other suitable mechanisms.

The illustrated leveling device 14 is a bubble level incorporated into the hand level 20, as is well known in the art. The bubble level is visible when looking through the hand level 20 so that the user can insure that the hand level 20 is level when sighting the reference marker 18. It should be appreciated that the leveling device 14 of the present invention can be any appropriate device that performs the required function of leveling the sighting device. For example, instead of a bubble level, the leveling device 14 could utilize a plumb bob or other suitable mechanisms.

The measuring device 16 of the illustrated embodiment is similar to a common tape measure and includes a housing 26 having a slotted opening 27, a tape 28 wound within the housing and positioned through the slotted opening 27, and a footplate 30 secured to the outer end of the tape 28. As with a standard tape measure, there is a biasing mechanism inside the housing 26 to provide a constant biasing force that pulls the tape 28 into the housing 26. Also similar to a standard tape measure, the housing 26 includes a locking device (internal to the housing) that can lock the position of (i.e., inhibit movement of) the tape 28 relative to the housing 26. The locking device is biased to the locked position and can be released by pressing on the release button 32. Such devices are well known in the tape measure field. It should be appreciated, however, that the measuring device 12 of the present invention could be any appropriate device that performs the required function of measuring the distance between the sighting device and the desired location to be measured. For example, instead of a tape measure, the measuring device 16 could utilize light beams (e.g., lasers or infrared), sound waves, or other suitable mechanisms for measuring distance.

Unlike a standard tape measure, the tape 28 includes both front markings 34 (on the radial inner surface of the tape) and back markings 36 (on the radial outer surface of the tape), and the housing 26 includes a visual opening 38 that allows visual access to the back markings 36. The visual opening 38 can be positioned in any suitable location on the housing 26. The back markings 36 are calibrated such that they indicate the distance from the end of the tape 28 to the center of the hand level 20 when mounted in the support. Preferably, the back markings 36 are expressed in tenths of a foot, which corresponds with standard surveying practice. A transparent window 40 covers the visual opening 38 to inhibit contamination of the inside of the housing 26.

The footplate 30 provides a surface that can be stepped on in order to position the end of the tape 28 against the ground 42. The footplate 30 also includes a notch 44 that can be wedged into a grading stake to secure the end of the tape 28 relative to the grading stake.

A belt hook 46 is provided so that the apparatus 10 can be secured to a user's belt.

FIG. 3 illustrates the apparatus 10 in use. Using an elevation map, the user first determines the desired elevation of a location spaced from the reference marker 18. A grading stake 48 is inserted into the ground 42 at that location. Standing behind the stake, the user presses the lock release button 32 and pulls the tape 28 from the housing 26. The user then places the footplate 30 on the ground 42 and puts one foot on the footplate 30. If desired, the notch 44 of the footplate 30 can be embedded into the stake 48. The user looks through the hand level 20 and, using the bubble level, holds the apparatus 10 level while moving it vertically. Once the reference marker 18 is sighted, the lock release button 32 is released, thereby locking the tape 28 relative to the housing 26. By viewing the back markings 36 through the visual opening 38, the user is given an accurate reading of the position of the ground 42 relative to the reference marker 18. This information can be written on the grading stake 48 for use in the fine grading operation.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An apparatus for checking the elevation of a location relative to the elevation of a different location, the apparatus comprising:

a sighting and leveling device having an orifice through which a user can view a reference mark along a sight axis, and further having an internal level visible by the user when looking through the orifice; and a measuring device coupled to the sighting and leveling device, the measuring device providing an indication of a distance from the sighting and leveling device to a location substantially perpendicular to the sight axis.

2. The apparatus of claim 1, wherein said sighting and leveling device comprises a hand level.

3. The apparatus of claim 1, wherein said internal level comprises a bubble level.

4. The apparatus of claim 1, further comprising a support, wherein said sighting and leveling device comprises a hand level detachably mounted on said support.

5. The apparatus of claim 1, wherein said measuring device comprises a tape measure.

6. The apparatus of claim 5, wherein said tape measure comprises a housing, measuring tape rolled within said housing, and a locking device operatively positioned between said housing and said tape.

7. The apparatus of claim 1, wherein said tape measure comprises a housing, measuring tape rolled within said housing, and a visual opening in said housing to facilitate viewing of a radial outer surface of said tape positioned within said housing.

8. A method of checking the elevation of a location relative to the elevation of a different location using an apparatus having a sighting device, a leveling device coupled to the sighting device, and a measuring device coupled to the sighting device, the method comprising the steps of:

holding the sighting device level;

aligning the sighting device with a reference mark while holding the sighting device level; and measuring the elevation from the sighting device to the location being measured using the measuring device.

9. The method of claim 8, wherein the sighting device comprises a hand level, and wherein said aligning step comprises the step of looking through the hand level.

10. The method of claim 8, wherein the measuring device comprises a tape measure having a housing and measuring tape rolled within the housing, and wherein said measuring step comprises the steps of:

pulling the tape from the housing;

positioning an end of the tape at the location; and reading a measurement on the tape.

11. The method of claim 10, wherein the measuring device further includes a footplate secured to the tape, and wherein said positioning step comprises the steps of:

positioning the foot plate at the location; and stepping on the footplate.

12. The method of claim 10, wherein the measuring device further includes a locking device operatively positioned between the housing and the tape, and wherein said measuring step further comprises, after said aligning step, the step of locking the tape relative to the housing.

13. The method of claim 10, wherein the housing includes a visual opening, and wherein said reading step includes looking through the visual opening to view a marking on the tape.

\* \* \* \* \*